March 27, 1962 W. STELZER 3,026,853
BOOSTER MOTOR MECHANISM
Filed May 28, 1959 3 Sheets-Sheet 1
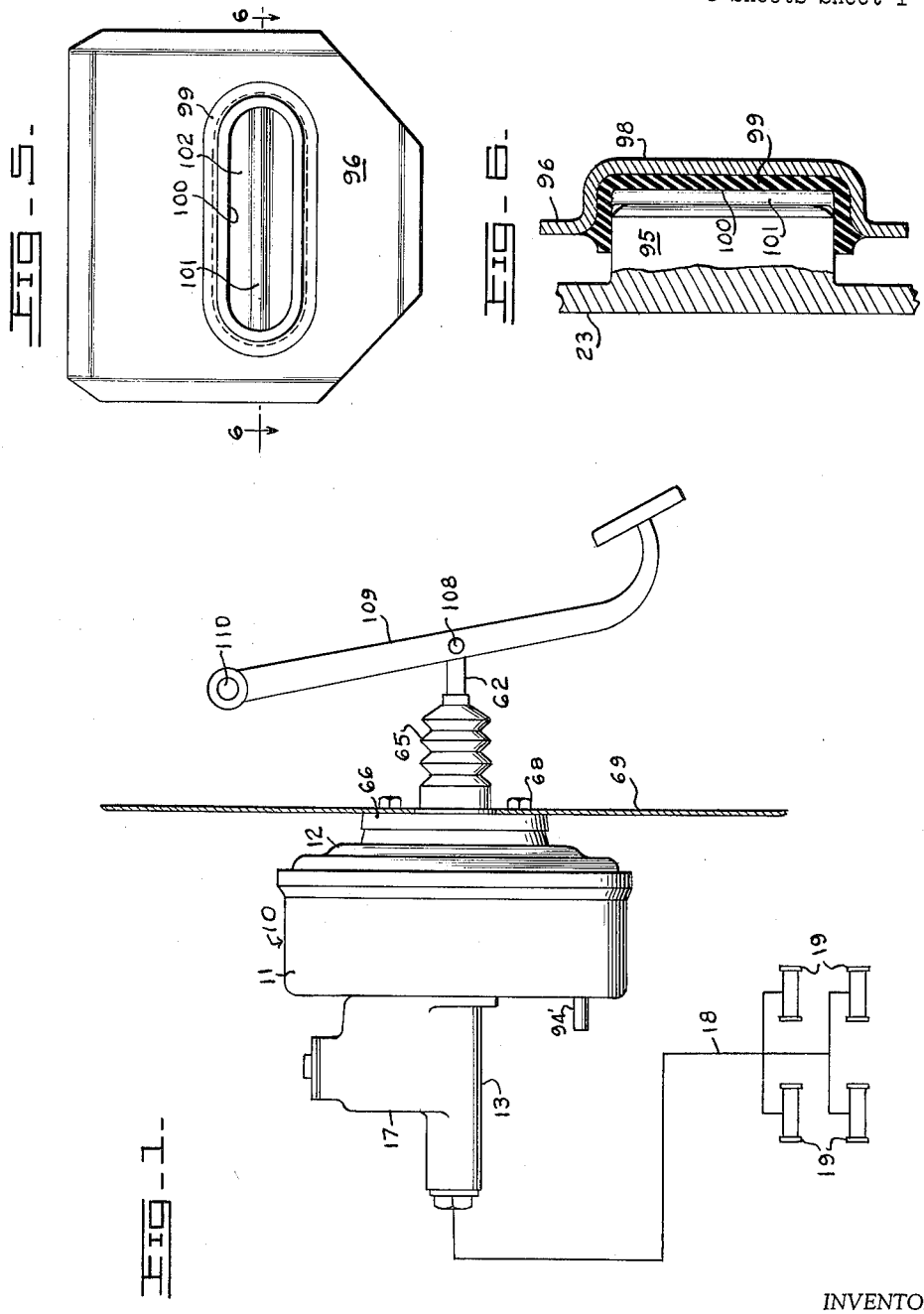
INVENTOR
WILLIAM STELZER
BY John F. Phillips
ATTORNEY

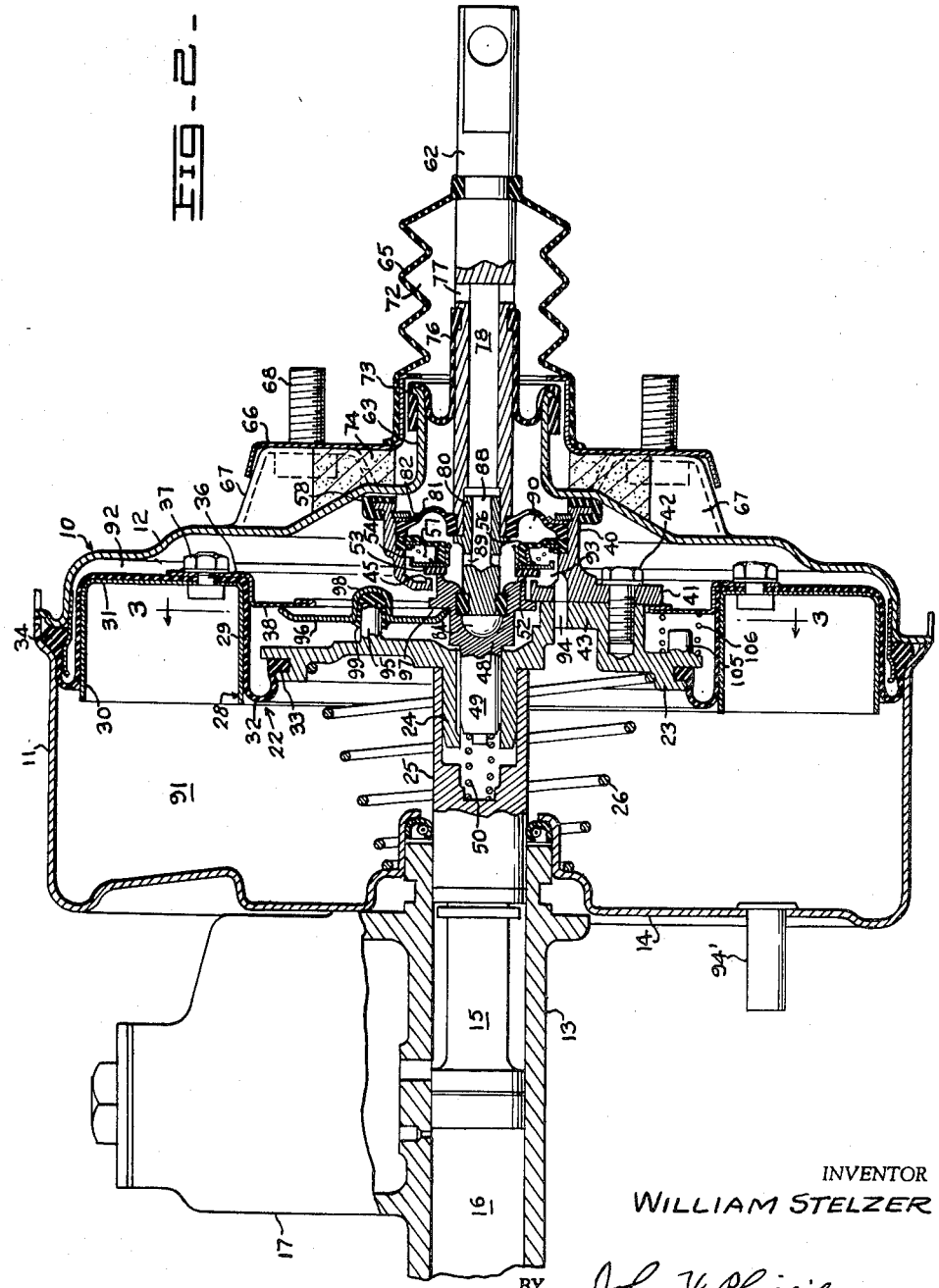

March 27, 1962 W. STELZER 3,026,853
BOOSTER MOTOR MECHANISM
Filed May 28, 1959 3 Sheets-Sheet 3
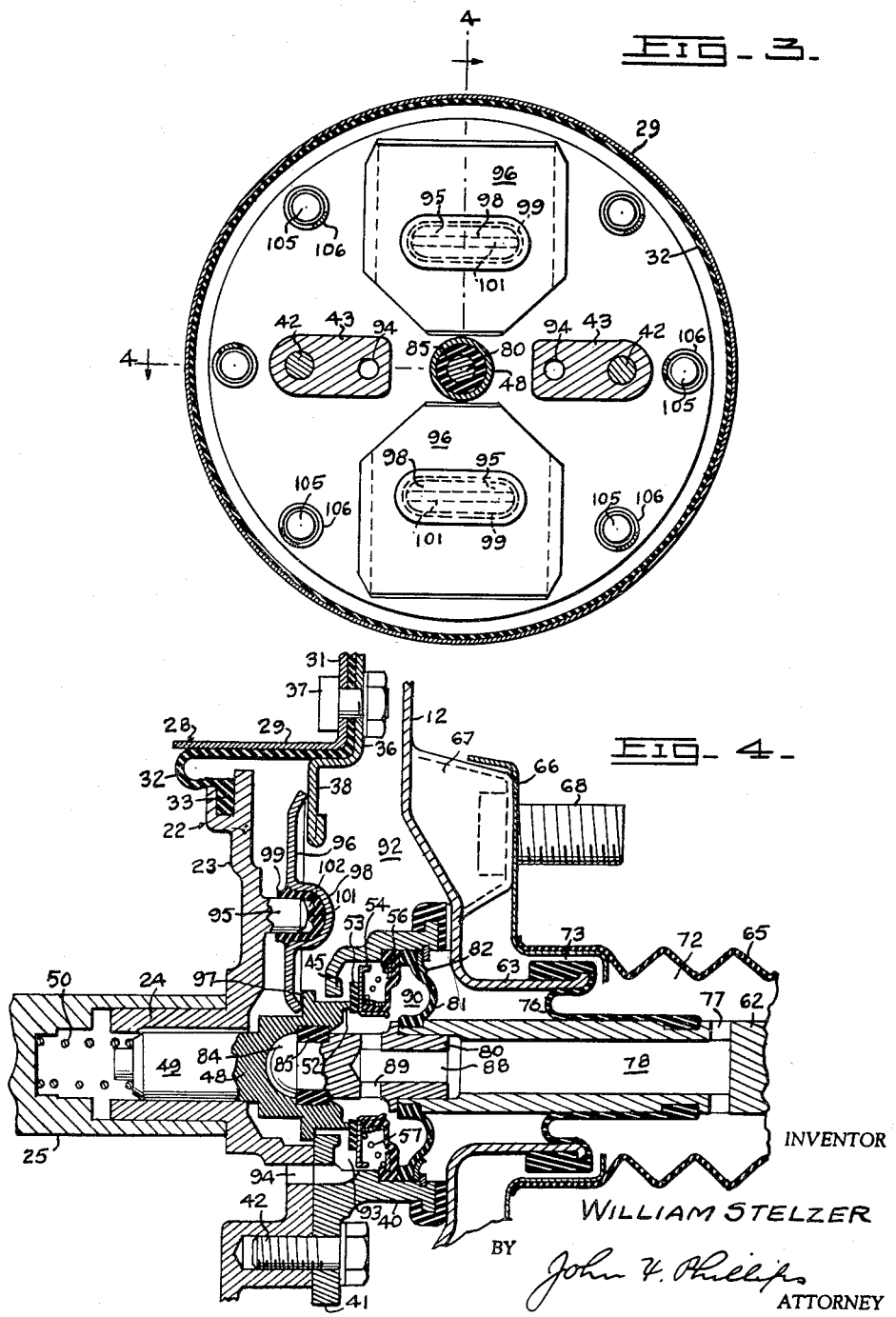
INVENTOR
WILLIAM STELZER
BY John H. Phillips
ATTORNEY United States Patent Office 3,026,853
Patented Mar. 27, 1962

3,026,853
BOOSTER MOTOR MECHANISM
William Stelzer, Bloomfield Hills, Mich., assignor to Kelsey-Hayes Company, Detroit, Mich., a corporation of Delaware
Filed May 28, 1959, Ser. No. 816,585
11 Claims. (Cl. 121—41)

This invention relates to a booster motor mechanism, and more particularly to such a mechanism especially intended for use in the hydraulic brake systems of motor vehicles.

In my copending application Serial No. 811,571, filed May 7, 1959, I have disclosed a booster motor mechanism of the same general type as in the present application, my copending application relating primarily to an improved type of follow-up valve mechanism for the fluid pressure motor wherein the valve mechanism is pressure-balanced so as to permit the transmission of accurate reaction to the brake pedal of a motor vehicle. The pressure-balancing of the valve mechanism accomplishes this result by eliminating any false "feel" in the brake pedal. The novel type of valve mechanism shown in the copending application referred to forms the principal subject matter of such application and the invention is so claimed. Such valve mechanism is disclosed in this application but forms per se no part of the present invention. Moreover, the invention of the copending application is claimed in combination, broadly, with a means for transmitting reaction to the brake pedal, such means being in the form of reaction levers connected between the valve mechanism and relatively axially movable parts of the pressure responsive unit of the motor. The reaction levers forming the principal subject matter of the present application are shown but not specifically claimed in my copending application referred to.

An important object of the present invention is to provide a highly improved type of lever reaction means of the general type referred to above, which provides for initial relatively free movement of the brake pedal without substantial resistance, thus providing an initial "soft" pedal, followed by the transmission to such pedal of reaction which will be proportional to the degree of energization of the booster motor.

More specifically, an object of the present invention is to provide a novel type of reaction lever in the combination, wherein the reaction lever transmits to the brake pedal forces developed by relative axial movement of relatively movable parts of the pressure responsive unit of the motor, and wherein novel resilient means is employed for supporting the reaction lever relative to one of such relatively movable parts of the pressure responsive unit.

A further object is to provide a novel type of reaction lever which is supplied with a pocket in which is bonded to the lever a resilient force transmitting body having an opening to receive a projeciton on one of the relatively axially movable parts of the pressure responsive unit, whereby the lever is wholly supported by such element of the pressure responsive unit.

A further object is to provide an arrangement of the character referred to wherein the resilient body and the projection arranged therein form the means for fulcruming the lever without the use of pivot pins or the like and wherein the resilient body is so shaped relative to the projection arranged therein as to provide for the relatively easy deformation of the resilient body upon initial movement of the brake pedal without substantially resisting such movement.

Other objects and advantages of the invention will become apparent during the course of the following description.

In the drawings I have shown one embodiment of the invention. In this showing:

FIGURE 1 is a side elevation of the motor shown connected to a brake pedal, a portion of the vehicle fire wall being shown in section and the connections of the master cylinder to the wheel cylinders being diagrammatically illustrated;

FIGURE 2 is an enlarged axial sectional view through the motor and associated parts, parts being broken away and parts being shown in elevation;

FIGURE 3 is a section taken substantially on line 3—3 of FIGURE 2;

FIGURE 4 is an enlarged fragmentary sectional view taken substantially on line 4—4 of FIGURE 3;

FIGURE 5 is a face view of one of the reaction lever elements; and

FIGURE 6 is a section on line 6—6 of FIGURE 5, taken through one of the lever elements and showing the arrangement therein of a supporting projection carried by a portion of the pressure responsive unit.

Referring to the drawings and particularly to FIGURE 2, the numeral 10 indicates the fluid pressure motor as a while comprising a pair of casing sections 11 and 12. A conventional master cylinder 13 is secured in any suitable manner to the back wall 14 of the casing section 11 and is provided therein with a conventional plunger 15 for generating hydraulic pressure in the master cylinder chamber 16. The master cylinder is provided with the usual reservoir 17. Pressure displaced from the chamber 16 flows through lines 18 to the usual vehicle wheel cylinders 19.

The motor is provided therein with a pressure responsive unit indicated as a whole by the numeral 22. This unit comprises an inner preferably die-cast body 23 having a tubular forwardly extending axial portion 24 fitting into a rearward extension 25 on the master cylinder plunger 15. The axial extension 25 is integral with the plunger 15 and serves to support the pressure responsive unit of the motor. The body 23 is biased to its normal position by a conventional return spring 26.

The pressure responsive unit 22 further comprises an annular shell 28 having an inner flange 29, and an outer flange 30 and an end wall 31. Around such shell extends a diaphragm 32 of the rolling type, the inner extremity of which terminates in a bead 33 connected to the body 23. The periphery of the diaphragm 32 is provided with a bead 34 suitably clamped between the housing sections 10 and 11. The joint for connecting these housing sections may be of any desired type and forms no part of the present invention. An annular plate 36 is secured, as at 37, to the end wall 31 and is provided with a radially inwardly extending flange 38 for a purpose to be described. It will be apparent that the body 23 and shell 28 are connected together by an intervening portion of the diaphragm 32, hence the pressure responsive unit comprises radially inner and outer portions which are axially movable relative to each other.

The pressure responsive unit comprises a second cast body 40 having portions 41 seating against and secured by screws 42 to pads 43 (FIGURE 3) cast integral with the body 23. Except for the connection described between the bodies 23 and 40, these bodies are spaced from each other for a reason which will become apparent. The body 40 is provided with an annular valve seat 45 engageable by a valve to be described.

A valve body 48 is arranged between the two bodies 23 and 40 and is provided with a forwarding extending stem 49 freely slidable in the axial extension 24. The valve body 48 is biased rearwardly or to the right in FIGURE 2 by a spring 50. At its rear extremity, the body 48 is provided with a valve seat 52 normally engaging with a resilient annular valve element 53 which is normally disengaged from the seat 45. The valve element 53 is carried by a cage 54 supported with respect to the body 40 by a diaphragm 56. A spring 57 biases the valve 53 toward the seats 45 and 52. The body 40 is provided with a rubber or similar bumper 58 normally seating against the adjacent wall of the casing section 12, as shown in FIGURES 2 and 4.

A pedal operable push rod 62 extends into the right-hand end of the motor and is surrounded by an axial extension 63 formed on the casing section 12 and substantially annularly spaced from the rod 62 for a purpose to be described. A boot 65 is connected between the push rod 62 and a cover shell 66 fixed to stamped bosses 67 formed on the casing section 12 and adapted for connection by bolts 68 to the fire wall 69 (FIGURE 1) of the motor vehicle. The space within the boot 65 forms an air chamber 72 communicating through a space 73 with the atmosphere through an air cleaner 74 mounted between the cover shell 66 and casing section 12.

A rolling diaphragm 76 is connected at its outer edge to the axial casing extension 63 and at its inner edge to the push rod 62 inwardly of air ports 77 in the push rod 12, which ports communicate with an axial passage 78 in the push rod 62. It will be apparent that the parts are in the off positions shown in FIGURE 2 and that the push rod is movable to the left of such position with the diaphragm 76 rolling along the inner surface of the axial casing section 63.

A connecting member 80 has its right-hand end press-fitted or welded into the adjacent end of the push rod 62 and clamps in position with respect thereto the inner bead of a diaphragm 81. The outer bead of such diaphragm is fixed by suitable means 82 to the body 40. The inner end of the connecting member 80 has a ball-and-socket connection 84 with the valve body 48, and a rubber connecting member 85 is arranged as shown in FIGURE 4 to resiliently fix the connecting member 80 in position and to permit some rocking movement between the member 80 and valve body 48 if such rocking movement is necessary, as referred to below.

The connecting member 80 is provided with an axial passage 88 communicating through ports 89 with a chamber 90 formed within the diaphragms 81 and 56 and shell 54. It will be apparent that the chamber 90 is always in communication with the atmosphere.

The pressure responsive unit divides the motor to form chambers 91 and 92, the latter of which is the control or variable pressure chamber of the motor. In the normal positions of the parts, the chamber 92 communicates with a chamber 93 radially outwardly of the valve seat 45, and the chamber 93 communicates through passage 94 with the chamber 91. A suitable nipple or other connection 94' is adapted for connection with a conduit leading to a source of vacuum to maintain the chamber 91 evacuated.

In previous constructions employing reaction levers for transmitting reaction to the brake pedal, it has been customary to employ three levers spaced 120° apart to secure a uniform distribution of reaction forces. With the structure of the reaction levers and associated elements, forming the principal subject matter of the present invention, I have found that two diametrically opposite levers may be employed. The cast body 23 is provided at diametrically opposite points with tangentially elongated fulcrum ribs 95 (FIGURES 3, 4 and 6). For the purpose of illustration, the sections in FIGURES 2 and 4 have been taken to show both a fulcrum rib and the screw 42 and associated parts, the sections being taken substantially as indicated on the line 4—4 of FIGURE 3. Therefore only one of the fulcrum ribs 95 and associated parts to be described are shown in FIGURE 4, but it will become clear that these elements are in diametrically opposite sets.

The fulcrum ribs 95 support reaction levers 96, which levers are clearly shown in FIGURES 4, 5 and 6. The inner ends of the levers are turned rearwardly to engage against an annular shoulder 97 formed on the valve body 48.

Referring to FIGURES 3-6, inclusive, each lever is in the form of a plate provided with a stamped portion 98 tangentially elongated to correspond to the elongation of the associated rib 95 (see particularly FIGURE 6). The stamped portion 98 of each lever forms a recess and a rubber or similar resilient body 99 is arranged in such recess and bonded to the metal of the lever. The resilient body 99 has its rear portion shaped to receive the adjacent fulcrum rib 95, the resilient body being provided with a recess 100 for this purpose. The bottom of this recess is provided with a rib 101 elongated longitudinally of the stamped portion 98 to extend throughout the length of the recess 100. In the off positions of the parts, the edge of the rib 101 contacts with the adjacent rib 95, and accordingly there are normally provided on opposite sides of the rib 101 elongated spaces 102 into which the material of the body 99, and particularly the rib 101, may be readily deformed upon initial operation of the apparatus, as described below.

At circumferentially spaced points, the body 23 is provided with rearwardly extending bosses 105. Coil springs 106 surround these bosses and engage at opposite ends against the body 23 and flange 38 to oppose movement of the latter toward the body 23 for a purpose to be described.

In the present instance, the rear end of the push rod 62 is shown as being pivotally connected as at 108 with a depending pedal lever 109. This lever is mounted on an upper fixed pivot 110 and, accordingly, the pivot 108 swings in an arc of a circle concentric with the axis of the pivot 110. The vertical component of movement of the pivot 108 is accommodated by the rocking and flexible connection between the member 80 and the valve 48. If desired, of course, the push rod 62 may move linearly and may be connected to the brake pedal by a suitable link.

*Operation*

The parts normally occupy the positions shown in FIGURES 2 and 4. The motor mechanism is operated in the usual manner by depressing the brake pedal 109 to move the push rod 62 to the left in FIGURES 2 and 4. The connecting member 80 is similarly moved to effect movement of the valve body 48 to the left. In the off positions of the parts, the radially inner and outer ends of the levers 96 substantially contact with the shoulder 97 and flange 38, respectively. Movement of the valve body 48 causes the shoulder 97 to move the radially inner ends of the levers 96 toward the left. Due to the factor of leverage, movement of the body 99 of the lever to the left will take place to a substantially less extent than the inner ends of the levers 96. Such movement takes place with negligible resistance. Since the body 99 is made of soft, readily deformable material, the initial movement referred to causes the ribs 101 of the levers 96 to exert pressure against the ends of the ribs 95, and such action results in the deforming of the ribs 101 into the spaces 102. Thus initial movement of the brake pedal takes place principally against the light loading of the spring 50 to provide a "soft" initial pedal.

The movement referred to continues with the valve element 53 following the valve seat 52 until the valve element contacts with the seat 45. At this point, the valve parts will be in lap position and the control chamber 92 will be disconnected from the chamber 93 with which it previously was in communication to effect the normal vacuum balancing of the pressure responsive unit in the off positions of the parts. Movement of the valve body 48 beyond the lap valve position moves the valve seat 52 away from the valve element 53, thus connecting the chamber 90 with the motor control chamber 92. The chamber 90 is always in communication with the atmosphere through passages 88 and 78, ports 77, chamber 72, space 73, and air cleaner 74.

Accordingly, air will flow into the control chamber 92 to effect movement of the pressure responsive unit 22 to the left in FIGURE 2. Movement of the body 23 of the pressure responsive unit transmits movement to the plunger 15 to displace fluid from the chamber 16 into the brake lines. Some resistance to such movement is encountered, of course, whereas the radially outer portion of the pressure responsive unit meets no resistance in its movement toward the left. However, the radially outer portion of the pressure responsive unit, namely, the shell 28 and diaphragm 32, do not tend to move to the left relative to the body 23 due to the action of the springs 106, acting as counter-reaction springs, to hold the flange 38 in engagement with the portions 41 of the body 40.

The radially inner and outer portions of the pressure responsive unit move as a unit until sufficient resistance to movement of the plunger 15 is encountered to overcome the loading of the springs 106. This occurs approximately at the point of initial contact of the brake shoes with the drums, whereupon the outer portion of the pressure responsive unit moves to the left relative to the body 23. The flange 38 thereupon tends to move the radially outer ends of the levers 96 to the left, causing the inner ends of such levers to exert a force against the shoulder 97 to oppose valve operating movement of the push rod 62. At this point in the operation of the mechanism, the material of the resilient body 99 will have been deformed substantially to its maximum extent to transmit accurate reaction to the brake pedal, there being a slight residual deformability in the resilient body 99 so that the reaction pressures are cushioned and not suddenly applied to their maximum extents.

In prior constructions, various surfaces of the valve mechanisms and associated parts have been subjected to different pressures which affect the "feel" and reaction transmitted to the brake pedal. This is eliminated in the present construction by the use of the diaphragms 76 and 81. It will be noted that the diaphragm 76 has an effective area between the push rod 62 and casing extension 63 which is substantially less than the effective areas of the faces of the diaphragm 81. The outer or right-hand face of the diaphragm 76 is always open to atmospheric pressure, and the same is true of the outer end of the rod 62. Such area of the rod 62 and the effective area of the diaphragm 76 combine to equal the effective area of each of the faces of the diaphragm 81. The left-hand face of the diaphragm 81 is always open to atmospheric pressure in the chamber 90, and the total atmospheric pressure acting to the right against the diaphragm 81 is equal to the total atmospheric pressure acting to the left against the effective area of the diaphragm 76 plus the exposed end of the rod 62. These pressures always balance each other.

The pressure in the space between the diaphragms 76 and 81 varies according to pressure in the motor control chamber 92, there being leakage past the bumper 58 or such element being grooved. In the off positions of the parts, full vacuum is present in this motor chamber and also in the space between the two diaphragms referred to, and when motor energization takes place, the space between the diaphragms is subject to increasing pressures in the chamber 92, the bumper 58 moving away from the casing section 12 as the pressure responsive unit 28 moves. The area of the right-hand face of the diaphragm 81 is substantially greater than the area of the left-hand face of the diaphragm 76. However, there is leakage around the stem 49, and the pressure at the left-hand end of such stem equals the pressure in the motor chamber 92. The area of the left-hand end of the stem 49 substantially cancels out the difference in the areas of the diaphragms 76 and 81, and accordingly there are balanced pressures affecting the adjacent faces of the diaphragms 76 and 81, taking into account the area of the left-hand end of the stem 49.

The various pressure surfaces just described are parts of movable structures which have surfaces exposed respectively to pressure in the motor chamber 92 to balance out each other, and surfaces exposed to the source of motor operating pressure, in this case the atmosphere, to balance out each other. Accordingly, the movable elements of the valve mechanism are substantially pressure-balanced so that there is no false "feel" or reaction transmitted to the brake pedal. Thus in operating the mechanism, the operator initially feels almost solely the resistance of the spring 50 minus the oppositely acting valve operating spring 57, and after the lap position of the valves has been passed, the operator feels only the resistance of the relatively light spring 50 until relative movement of the parts of the pressure responsive unit takes place to transmit reaction to the brake pedal through the levers 96. The operator therefore feels an accurate reaction to movement of his foot during actual brake application without having any false "feel" reaction transmitted to his foot because of the presence of fluid pressures acting on the pedal operable push rod. The mechanism thus provides for the highly efficient operation of the brake mechanism of a motor vehicle.

While the principal features of the present construction require their operation in combination with a follow-up valve mechanism, such mechanism need not be of the specific pressure-balancing type referred to. Such type of valve mechanism forms the principal subject matter of my copending application Serial No. 811,571, referred to above.

The operation upon the releasing of the brake pedal will be apparent. The valve return spring 50 will return the valve element 53 to its normal position to reestablish connection between the motor chamber 92 and the chamber 93, and air will be evacuated from the chamber 92 through the passage 94 and the constant vacuum chamber 91. The return spring 26 will then return the pressure responsive unit to its off position. When pressure is released from the chamber 92, the counter-reaction springs 106 will return the radially outer portion of the pressure responsive unit to its normal position with the flange 38 engaging the portions 41 of the valve body 40. Particular attention is invited to the fact that the rocking action of the reaction levers 96 during operation of the motor mechanism is provided for by the resiliency of the body 99. Thus the resilient body 99 of each lever cooperates with the associated rib 95 to support the lever in position without the use of pivot pins or similar fulcrum means. The recess 100 of each lever 96 corresponds in shape and size to the associated rib 95, and such rib may be slidable in such recess. The parts initially are in the relative positions shown in FIGURE 4 so that some sliding of each rib in the associated recess 100 may take place. However, there may be a snugger fit between each resilient body 99 and its associated rib 95, in which case movement of the rib into the recess may take place by deforming the surrounding resilient body 99 in a shearing action.

The actual degree of rocking of each lever 96 is relatively slight and is effectively taken care of by engagement of the body 99 with the associated rib 95, and the resiliency of the body 99 offers negligible resistance to rocking movement of the lever. When the parts are released, of course, the counter-reaction springs 106 return the flange 38 to its normal position relative to the cast body 23, thus releasing pressure on the outer ends of the levers 96 so that the resilience of the body 99 of each lever returns the latter to its normal position.

It also will be apparent that the use of the particular type of reaction levers shown facilitates the assembling of the mechanism. These levers are assembled relative to the pressure responsive unit of the motor merely by pushing them into position on the ribs 95. This requires a minimum length of time, it being unnecessary to place and fix any pivot connections between the cast body 23 and the levers 96.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster motor mechanism comprising a casing, a pressure responsive unit therein forming therewith a control chamber, said pressure responsive unit comprising radially inner and outer relatively axially movable sections, a follow-up valve mechanism normally connecting said control chamber to a source of low pressure and movable to connect such chamber to a source of higher pressure, and means for opposing movement of said valve mechanism in accordance with relative movement of said sections incident to different degrees of resistance to movement thereof, such means comprising a lever, and interengaging elements carried respectively by one of said sections and by said lever and one of which elements comprises a resilient body for supporting said lever relative to said one section and providing for rocking movement of said lever, said lever having mechanical engagement at all times with said valve mechanism and with the other section.

2. A booster motor mechanism comprising a casing, a pressure responsive unit therein forming therewith a control chamber, said pressure responsive unit comprising radially inner and outer relatively axially movable sections, a follow-up valve mechanism normally connecting said control chamber to a source of low pressure and movable to connect such chamber to a source of higher pressure, and means for opposing movement of said valve mechanism in accordance with relative movement of said sections incident to different degrees of resistance to movement thereof, such means comprising a lever, and interengaging elements carried respectively by one of said sections and by said lever, one of said elements comprising a resilient body having a recess therein and the other element comprising a rigid projection arranged in said recess to support said lever, said resilient body providing for rocking movement of said lever relative to said projection, in accordance with relative movement of said sections incident to different degrees of resistance to movement thereof, said lever having mechanical engagement at all times with said valve mechanism and with said other section.

3. A motor mechanism according to claim 2 wherein said projection has an end spaced from the bottom of said recess and said body in the bottom of said recess had portions projecting into engagement with said end of said projection whereby, upon movement of said lever by movement of said valve mechanism, said portions of said body in said recess will be deformed without offering substantial resistance to initial movement of said valve mechanism.

4. A booster motor mechanism comprising a casing, a pressure responsive unit therein forming therewith a control chamber, said pressure responsive unit comprising radially inner and outer relatively axially movable sections, a follow-up valve mechanism normally connecting said control chamber to a source of low pressure and movable to connect such chamber to a source of higher pressure, and means for opposing movement of said valve mechanism in accordance with relative movement of said sections incident to different degrees of resistance to movement thereof, such means comprising diametrically opposite radially arranged levers, and interengaging elements carried by each lever and by one of said sections adjacent each lever and comprising a resilient body having a recess and a projection engageable in the recess of each resilient body, each projection being spaced from the bottom of the associated recess and each resilient body having a rib in the bottom of its recess engageable with the associated projection whereby initial movement of said valve mechanism will move each lever and deform the associated rib without substantial resistance to such movement of said valve mechanism.

5. A booster motor mechanism comprising a casing, a pressure responsive unit forming therewith a control chamber, said pressure responsive unit comprising radially inner and outer annular relatively axially movable sections, an axial member to be operated connected to the radially inner section, an axially arranged follow-up valve mechanism normally connecting said control chamber to a source of low pressure and movable to connect such chamber to a source of high pressure, a plurality of radial reaction levers each engaging at all times at opposite ends against said valve mechanism and said radially outer section, and means establishing mechanical engagement between each lever and said radially inner section, comprising a resilient body supporting each lever and providing for rocking movement thereof in accordance with relative movement of said radially inner and outer sections incident to resistance to movement of said member to be operated.

6. A booster motor mechanism comprising a casing, a pressure responsive unit forming therewith a control chamber, said pressure responsive unit comprising radially inner and outer annular relatively axially movable sections, an axial member to be operated connected to the radially inner section, an axially arranged follow-up valve mechanism normally connecting said control chamber to a source of low pressure and movable to connect such chamber to a source of high pressure, a plurality of radial reaction levers each engaging at all times at opposite ends against said valve mechanism and said radially outer section, and connecting elements carried respectively by said radially inner section and by each lever and comprising a rigid projection extending parallel to the axis of the motor and a resilient body having a recess receiving said projection whereby each lever is rockable by deforming its associated resilient body.

7. A motor mechanism according to claim 6 wherein each projection has an end spaced from the bottom of its associated recess, each resilient body having portions engaging such end of said projection, said portions of each resilient body being readily-deformable by movement of the associated lever incident to initial movement of said valve mechanism without substantially resisting such movement.

8. A motor mechanism according to claim 7 wherein each recess and projection is elongated transversely of the associated lever.

9. A motor mechanism according to claim 7 wherein each recess and projection is elongated transversely of the associated lever, each projection having an end spaced from the bottom of the associated recess, each resilient body having a narrow integral rib centrally of the width of the associated recess elongated longitudinally of such recess engaging said end of the associated projection.

10. A booster motor mechanism comprising a casing, a pressure responsive unit forming therewith a control chamber, said pressure responsive unit comprising radially inner and outer annular relatively axially movable sections, an axial member to be operated connected to the radially inner section, an axially arranged follow-up valve mechanism normally connecting said control chamber to a source of low pressure and movable to connect such chamber to a source of high pressure, a pair of diametrically opposite radial reaction levers engaging at opposite ends against said valve mechanism and said radially outer section, each lever being in the form of a plate having a portion stamped to provide a recess elongated transversely of the lever, a resilient body mounted in each recess and bonded to the associated lever, each resilient body having a recess elongated longitudinally of the recess in the associated lever, a projection carried by said radially inner section of said pressure responsive unit and corresponding in shape to and arranged in the recess in each of said resilient bodies whereby each lever is supported through its resilient body for rocking movement upon relative movement of said sections incident to resistance to movement of said member to be operated.

11. A motor mechanism in accordance with claim 10 wherein each projection has an end spaced from the bottom of the recess in the associated resilient body, each resilient body in the recess therein having a projecting rib extending longitudinally of such recess and engaging said end of the associated projection.

References Cited in the file of this patent

UNITED STATES PATENTS

| | | |
|---|---|---|
| 2,126,041 | Rike | Mar. 11, 1958 |
| 2,826,042 | Rike et al. | Mar. 11, 1958 |
| 2,832,316 | Ingres | Apr. 29, 1958 |
| 2,867,193 | Ayers | Jan. 6, 1959 |
| 2,876,627 | Ayers | Mar. 10, 1959 |